United States Patent [19]

Churchill et al.

[11] 4,196,950

[45] Apr. 8, 1980

[54] REFRIGERATOR CONSTRUCTION

[75] Inventors: Geoffrey B. Churchill, Wilbraham; John H. Southern, Longmeadow, both of Mass.

[73] Assignee: Monsanto Company, St. Louis, Mo.

[21] Appl. No.: 926,047

[22] Filed: Jul. 19, 1978

[51] Int. Cl.$^2$ .................. F25D 23/08; B65D 87/34; A47B 81/00
[52] U.S. Cl. ...................... 312/214; 52/232; 52/309.9; 156/79; 220/435; 428/313; 428/315
[58] Field of Search .............. 312/214; 220/444, 467, 220/453, 435, 456, 457; 428/313, 315, 310; 156/79; 52/232, 573, 309.8, 309.9

[56] References Cited

U.S. PATENT DOCUMENTS

| | | | |
|---|---|---|---|
| 3,813,137 | 5/1974 | Fellwock et al. | 312/214 |
| 3,862,880 | 1/1975 | Feldman | 428/315 |
| 3,911,190 | 10/1975 | Myers et al. | 156/79 |
| 3,923,355 | 12/1975 | Dieterich | 220/444 |
| 3,944,111 | 3/1976 | Nonomaque et al. | 220/453 |
| 3,960,631 | 6/1976 | Weiss et al. | 312/214 |

Primary Examiner—Alexander Grosz
Attorney, Agent, or Firm—David Bennett; William J. Farrington; Stanley M. Tarter

[57] ABSTRACT

An improved refrigerator cabinet construction is described which comprises, in laminated sequence, a metal outer layer, a foam layer, a composite release film and, strongly bonded thereto, an ABS layer. The laminate has a strong bond between all but two of the various contiguous layers and a weak bond between the remaining pair of contiguous layers, such that when the laminate is cycled between room temperature and $-22°$ C., only the weak bond is ruptured, the location of the weak bond being such that, in the event it were to be ruptured, the ABS layer and the portion of the laminate remaining adhered thereto would be reprocessable to produce an ABS with a Gardner impact strength that is at least 85% of that of the original ABS sheet incorporated in the laminate.

14 Claims, 3 Drawing Figures

REFRIGERATOR CONSTRUCTION

This invention relates to refrigerators and specifically to an improved refrigerator cabinet construction that has significant advantages over the constructions of the prior art.

BACKGROUND OF THE INVENTION

A refrigerator cabinet comprises three essential structural components. The first is the outer shell which is of metal and is comparatively thin but tough enough to withstand normal kitchen wear and tear. The second is a molded plastic inner layer providing a hygienic interior surface able to withstand a degree of rough treatment at quite low temperatures.

The plastic inner layer is conventionally an impact resistant styrenic polymer such as rubber modified polystyrene (HIPS) or the product of polymerizing styrene and acrylonitrile in the presence of a rubber such as polybutadiene (ABS). Alternatively, the plastic inner layer can be formed of any other suitable tough polymer, for example a polyester such as polyethylene terephthalate, a polycarbonate, a polyacetal or a blend of polyphenylene oxide with HIPS such as "Noryl" (Trade name of General Electric Company). In general however, ABS is by far the most widely used polymer for producing refrigerator inner layers and the description of the invention that follows is couched in terms of ABS. It should be understood however, that this is a matter of convenience only and implies no necessary limitation on the scope of the invention.

Intermediate these layers is the third component. This is a foam material and provides the insulation between the interior of the cabinet and the ambient air.

The foam is produced in situ and is usually a conventional rigid polyurethane foam formed by reaction of an isocyanate with, for example, a polyol or polyamine. It is not essential that the foam be a polyurethane but as a matter of practical convenience and economy it usually is. The blowing agent is usually a halohydrocarbon though other materials that are gaseous or produce gases under polymer formation conditions, can be used.

In a conventional refrigerator the inner and outer layer are located in position and a foam is produced in situ so as to fill the intervening space and hold the inner layer in its appointed position.

It is found however, that in the normal use of the refrigerator a temperature gradient is set up across the thickness of the wall and, if the foam is tightly bonded to both the outer metal shell and the plastic inner layer the foam transmits the stresses induced by differential expansion and contraction of the metal and foam layers to the inner layer and this can often, in time, give rise to stress cracking of the inner layer.

In an attempt to prevent this it has been proposed in U.S. Pat. No. 3,923,355 to coat the foam-contacting surface of either the outer or inner layer with an elastomeric adhesive permitting limited movement between the foam and the layer. An alternative but expensive approach is to coat the foam contacting surface of the inner or outer layer with a release agent only in those areas susceptible to stress concentrations.

A further solution proposed in U.S. Pat. No. 3,960,631 is to interpose between the foam and the plastic inner layer a release film capable of forming a weak bond with the foam that may be broken by the forces engendered by differential expansion of the layers.

However, in the event that an inner layer is damaged and has to be discarded it has been found necessary to perform the laborious and time-consuming task of manually stripping the liner film from the inner layer, to which it adheres well, before the inner layer can be reground and re-formed. This is because admixture of the films conventionally used to provide the release layer has a severely deleterious effect on the impact strength of the polymers from which the inner layer is conventionally made.

The present invention represents an improvement in the approach described in U.S. Pat. No. 3,960,631 in that it obviates the need for the stripping of the release film from the inner layer and so substantially reduces the expense of re-processing scrap inner layers.

DESCRIPTION OF THE INVENTION

The invention provides an improved refrigerator cabinet construction comprising, in laminated sequence, a metal outer layer, a foam layer, a composite release film and, strongly bonded thereto, an ABS layer in which the improvement comprises providing a strong bond between all but two of the various contiguous layers and a weak bond between the remaining pair of contiguous layers, the relative strengths of the bonds being such that when the laminate is cycled between room temperature and $-22°$ C. causing differential thermal expansion of the layers in the laminate, only the weak bond is ruptured, and the location of the weak bond being such that, in the event it were to be ruptured, the ABS layer and the portion of the laminate remaining adhered thereto wound be reprocessable to produce an ABS with a Gardner impact strength that is at least 85% of that of the original ABS sheet incorporated in the laminate.

Gardner impact strength is measured according to the procedure set forth in Cohen et al., Materials Research and Standards, Volume 9, No. 5, p. 21 to 24 (1969). An empirical relationship between the Gardner impact strength and the following described multiaxial impact strength is as follows:

Multiaxial Impact Strength (also called Falling Ball Impact or FBI)=0.014 (Gardner Impact)$^2$.

As indicated above the term "ABS" as used herein is not meant to be read literally as referring solely to polymers of acrylonitrile and styrene produced in the presence of polybutadiene. Rather the term is used as a convenience to cover the many possible tough thermoformable plastics, of which ABS is the prime exemplar, that are suitable for food-contacting purposes and which are not embrittled at temperatures usually encountered inside a commercial refrigerator.

The metal outer cabinet is usually of sheet steel though other alloys can be used. Its sole relevant characteristic so far as this invention is concerned is that, being a metal, its co-effecient of expansion is very much smaller than that of the foam to which it is tightly bonded in the construction laminate of this invention.

The composite release film is a laminate of at least two layers. The layer contiguous with the ABS inner layer is capable of forming a strong bond with the ABS. It is not necessary that the film be produced separately. Lamination can occur, for example, by thermoforming the component layers together with the ABS inner layer before being adhered to the foam.

The release properties of the composite film are provided by the other (i.e., *not* contiguous with the ABS layer) component(s) of the composite film. This can be done in a number of ways, all of which are understood to be embraced by this invention. One preferred way is to provide that the weak bond, i.e., the one that ruptures when the laminate is cycled between room temperature and −22° C., is the one between the surface of the composite film in contact with the foam and the foam itself. If this option is selected it is therefore necessary that the composite film taken as a whole when reground with the ABS inner layer does not reduce the Gardner impact strength of the unblended ABS by more than 15%.

It is found however, that most polymers forming weak bonds with polyurethane foams seriously reduce the impact strength of an ABS polymer when blended therewith in significant amounts. The above restriction on the effect on the ABS impact strength is therefore in practice a restriction on the relative thicknesses of the ABS and the layer of the composite release film in contact with the foam. Where this layer is formed from, for example, a polyolefin such as polyethylene, it may not have a thickness such that its weight per unit area of laminate is more than 0.9% of the weight per unit area of the ABS sheet.

Typical polymers that can be used to form the weak bond with the polyurethane foam layer are non-polar polymers like polyolefins for example, high and low density polyethylenes and polypropylene and olefin copolymers such as ethylene/vinyl acetate copolymers. Of the available alternatives polyethylene is the preferred polymer for use in this embodiment of the invention.

The effect on the impact strength of the ABS is likewise a limitation on the layer of the composite release film that is tightly bonded to the ABS.

In general, it is found that polymers having a minimal effect in this respect are polar polymers that are not degraded at ABS processing temperatures up to about 270° C. and are compatible up to a level of about 4% by weight of the ABS. The term "compatible" as used herein describes those polymers which do not cause the Gardner impact strength of an ABS polymer to drop by more than 15% when 4% by weight of the polymer is blended therewith. Suitable compatible polymers include polyesters such as polyethylene terephthalate, styrene polymers and copolymers, nylon 6 (polycaprolactam), polyvinyl chloride and polymers of acrylonitrile comprising from 55 to 90% by weight of acrylonitrile with from 45 to 10% of a copolymerizable monomer such as an alkenyl-aromatic monomer, an alkyl acrylate, a vinyl ester or a vinyl ether and an optional rubber modifier.

The kinds of structure that would be covered by this embodiment comprise an ABS inner layer laminated to a composite release film comprising a first layer tightly bonded to the ABS layer having a thickness of up to 4% of that of the ABS layer which is in turn laminated to a second layer having a thickness of up to 0.9% of the ABS layer. The thickness of the ABS layer is usually from 3 to 8 mm before thermoforming.

Another method of producing a refrigerator construction laminate according to the invention is to provide that the weak bond is between contiguous layers comprising the composite release film. This may be done by appropriate selection of the polymers from which the contiguous films are formed but it is probably more feasible to apply an appropriate coating to one or both of the surfaces to be laminated together.

Alternatively, the lamination conditions can be selected such that the bond is not fully developed provided that, if subsequent thermoforming of a laminate of the ABS layer with the composite release film is required, such thermoforming would not complete development of a tight bond.

The layer of the composite film that remains attached to the ABS sheet after rupture of the weak bond is subject to the same constraints and preferences as are set forth above. The layer which is adhered to the foam may vary much more widely. That is to say, there is no practical thickness limitation based on compatibility with ABS on re-grind: the bond does not need to be weak and can be excellent. In fact, however, composite release layers with thick ABS-incompatible layers providing the foam adhering surface are not preferred because in practice it is necessary to identify defective structures before the finished laminate is constructed. Thus, conventionally, an extruded ABS sheet is laminated to the composite release layer and this sub-laminate is thermoformed into the appropriate configuration. Now defective structures may be detected after lamination or after thermoforming. In either case, it will be necessary to perform the laborious task of stripping the second layer, i.e., that intended to be bonded to the foam, before the ABS can be re-processed. The preferred embodiments of this invention seek to avoid such impediments to efficient recycling of scrap. This can be done by providing that any such foam-adhering layer of the composite release film is subject to the same thickness limitations as are set forth above; i.e., that when an ABS/composite release film laminate is re-processed, the impact strength of the product is at least 85% that of the pure ABS.

There is no reason for the two layers to be of different materials providing the bond between the two can be easily broken. One way in which such a composite release film can be produced is to form a bilayer film by a conventional blown bubble technique modified such that the gas used to form the bubble has, entrained in the gas flow, a suitable release agent in the form of finely divided particles or droplets. When such a bubble is collapsed, it will form a bilayer film in which the identical layers are only weakly bonded together.

Other methods and variations on this theme will readily suggest themselves to the man of ordinary skill in the art.

One preferred feature of the invention is to provide that one of the layers of the composite film is an effective barrier to the passage of the gas used to produce the layer. Such gases include halohydrocarbons such as trichlorofluoromethane, dichlorodifluoromethane, 1,1,2-trichloro-1,2,2-trifluoroethane, octafluorocyclobutane and mixtures thereof. These gases are advantageously retained in the foam layer because they improve the thermal insulation characteristics. It is also advisable to use a barrier layer to protect the ABS layer from attack by the gas. The utility of providing such a barrier layer, refrigerator laminates incorporating such layers, and suitable materials from which they can be fabricated are fully described in U.S. Pat. No. 4,005,919 which is fully incorporated herein by reference.

The barrier layer can be and often is the layer that is bonded directly to the ABS though of course, it can form a third layer of the composite release film (distinct from that contacting either the ABS or foam layers).

The refrigerator construction laminate of the invention is usually produced at least in part, in situ, that is to say the ABS inner layer and the composite release film of the component layers thereof are together thermoformed into the desired shape so as to produce a cohesive laminate and this is then located inside the metal shell of the refrigerator, defining a space between the shell and the inserted shape. This space is then filled with foam giving the structure a suitable rigidity and cohesion.

DESCRIPTION OF THE DRAWINGS

Various embodiments of the invention are now described with reference to the attached drawings which should not be interpreted as implying any limitation on the scope of the invention.

A—the ABS inner layer.

F—the foam layer.

$C_A$—the layer of the composite release film that is laminated to the ABS inner layer and is bonded tightly thereto.

$C_F$—the layer of the composite release film that is laminated to the foam.

$C_B$—(where used) a barrier layer that forms part of the composite release film.

Figure 1:
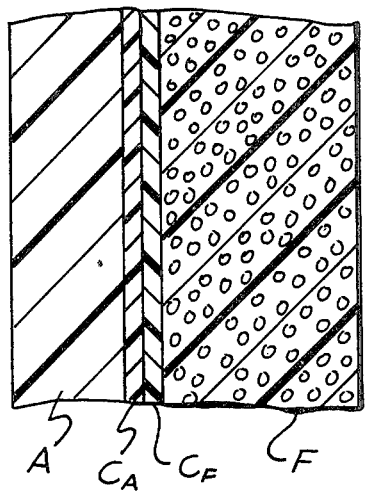
FIGS. 1 and 2 of the drawings illustrate a partial diagrammatic cross-section of alternative embodiments of a refrigerator cabinet construction according to the invention omitting the metal outer layer which is laminated to the foam layer. The symbols used have the following significances.

In FIG. 1 the weak bond may be between CF and F or between CA and CF.

Figure 2:
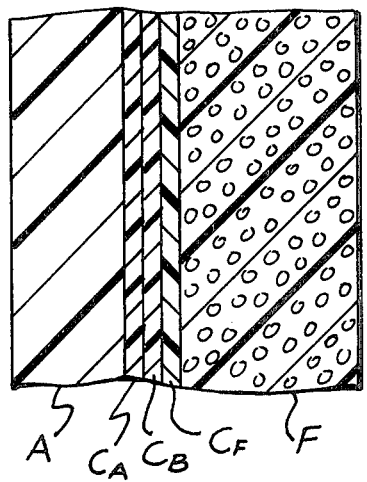

In FIG. 2, where a separate barrier layer is provided, the weak bond may be between CF and F, CF and CB, or CA and CB.

In both FIG. 1 and FIG. 2:

(a) Either or both of CA and CF can be barrier films.

(b) In the event the weak bond is between CA and CF or CA and CB or CB and CF the bonded layers can be of identical polymers.

(c) In the event the weak bond is between CF and F, the relative thicknesses of CA, CF and (where present) CB and the materials from which they are made must be such that upon regrinding with A an impure polymer is obtained with an impact strength that is at least 85% of that of pure A.

Figure 3:
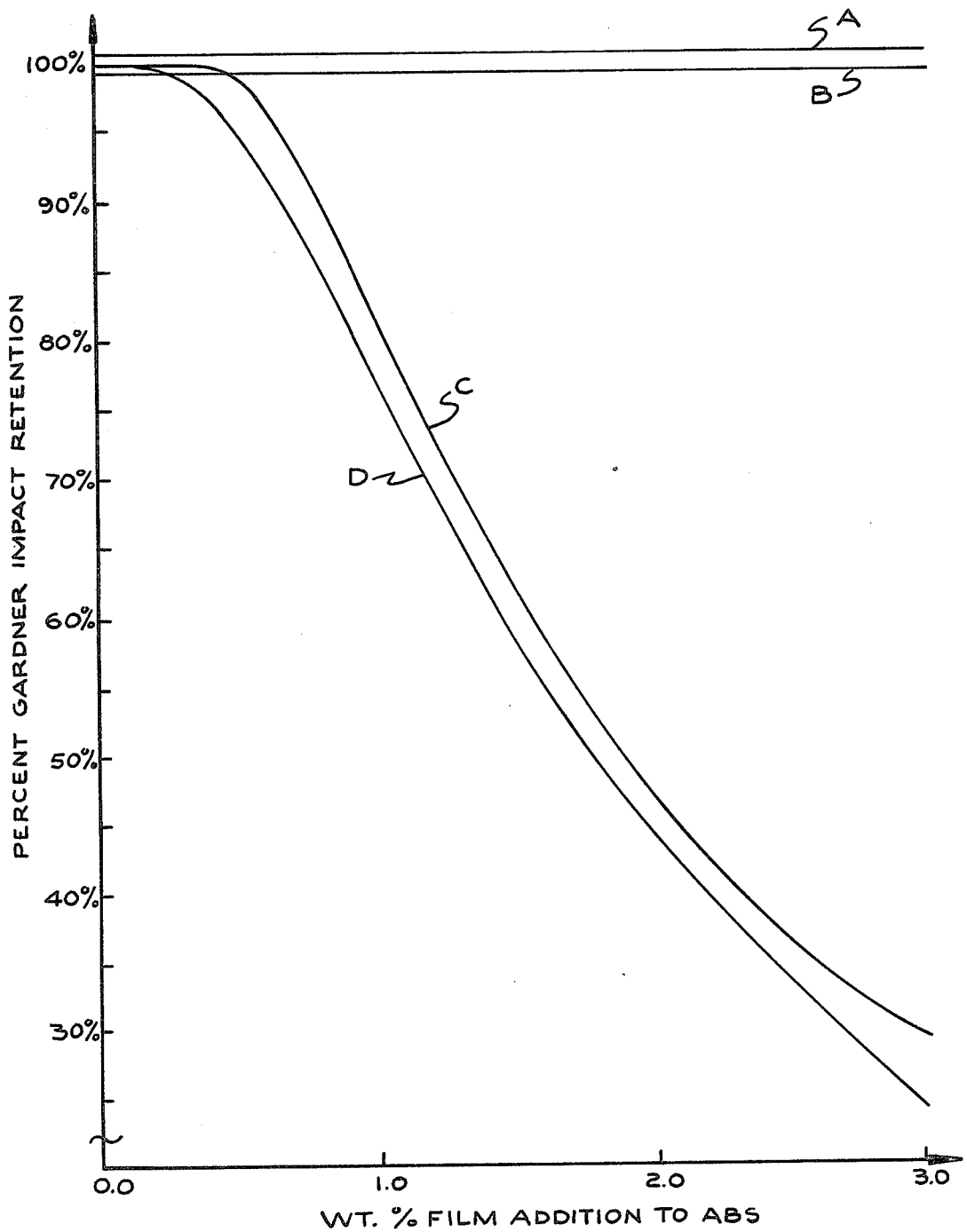

FIG. 3 is a graph showing the variation of ABS Gardner impact strength with the amount of four different polymer films blended therewith. Each curve represents a different polymer:

A is nylon 6;

B is an acrylonitrile copolymer sold by Standard Oil Company under the trade name Barex 210;

C is an ethylene/vinyl acetate copolymer containing 18% vinyl acetate; and

D is high density polyethylene.

It can readily be seen that a percentage of only 1.0% of the polyethylene reduced the impact strength of the ABS to a level that is less than 85% of that of the pure ABS sheet.

Nylon 6 and Barex 210 are examples of preferred compatible polymers that have little effect on the ABS impact strength even beyond the 4% limit specified herein.

EXAMPLE

An ABS sheet 5 mm in thickness is laminated to a composite release film comprising a layer of an acrylonitrile/styrene copolymer comprising 70% acrylonitrile 0.15 mm in thickness and a layer of polyethylene 0.01 mm in thickness such that the acrylonitrile copolymer is in contact with the ABS sheet.

The laminate is then thermoformed into the shape of a refrigerator interior with the ABS layer forming the interior surface. The shaped laminate is located within a refrigerator outer cabinet formed from sheet steel such that a space of about 5 cm separates the cabinet from the shaped laminate. A polyurethane material is then injected into the space under such conditions as to cause the polyurethane to foam and fill the space completely.

The refrigerator cabinet thus formed is then cooled from room temperature to around $-22°$ C. and held at that temperature for 2 hours after which it is allowed to regain room temperature. Examination of the cabinet construction reveals that only the bond between the foam and the polyethylene component of the composite release film has ruptured.

Repeating cycling of the cabinet through the above cycle is not found to lead to stress cracking of the ABS inner layer.

Regrinding of the ABS layer with the composite release film attached gives an impure ABS with a Gardner impact better than 90% of that of the original pure ABS.

It is understood that many modifications and variations of the invention described herein could be devised without departing from the essential concept it embodies. It is intended that all such modifications and variations should be embraced within the general purview of this invention.

What is claimed is:

1. An improved refrigerator cabinet construction comprising, in laminated sequence, a metal outer layer, a foam layer, a composite release film and strongly bonded thereto an ABS layer in which the improvement comprises providing a strong bond between all but two of the various contiguous layers and a weak bond between the remaining pair of contiguous layers, the relative strengths of the bonds being such that when the laminate is cycled between room temperature and $-22°$ C. causing differential thermal expansion of the layers in the laminate, only the weak bond is ruptured and the location of the weak bond being such that, in the event it were to be ruptured, the ABS layer and the portion of the laminate remaining adhered thereto would be reprocessable to produce an ABS with a Gardner impact strength that is at least 85% of that of the original ABS sheet incorporated in the laminate.

2. A refrigerator cabinet construction according to claim 1 in which the weak bond is between the composite release film and the foam.

3. A refrigerator cabinet construction according to claim 2 in which the composite release film comprises a first layer of a polar polymer that is compatible with ABS at least up to the 4% by weight level and does not degrade at temperatures below 270° C. and a second layer of a non-polar polymer that is incompatible with the ABS, the first and second layers having thicknesses of up to 4% and up to 0.9% respectively of the thickness of the ABS layer.

4. A refrigerator cabinet construction according to claim 3 wherein the thickness of the ABS sheet before thermoforming is from 3 to 8 mm and wherein the first layer of the composite release film comprises a polymer selected from nylon 6 and a nitrile copolymer containing from 55 to 90% by weight of a nitrile monomer, and the second layer is a polyolefin.

5. A refrigerator cabinet construction according to claim 2 in which the composite release film comprises a layer that is an effective barrier to halohydrocarbon gases.

6. A refrigerator cabinet construction according to claim 1 in which the weak bond is between contiguous layers of the composite release film.

7. A refrigerator cabinet construction according to claim 7 in which the composite release film comprises a first layer formed from a polar polymer that is compatible with ABS at least up to the 4% by weight level, and does not degrade at temperatures below 270° C. which layer, in the laminate, is bonded to the ABS inner layer.

8. A refrigerator cabinet construction according to claim 8 in which the composite release film is a bilayer in which one or both of the contiguous surfaces of the bilayer has been treated with an adhesion-reducing substance.

9. A refrigerator cabinet construction according to claim 9 in which the layers of the bilayer are identical.

10. A refrigerator cabinet construction according to claim 8 in which the first layer of the composite release film is a polymer selected from the group consisting of nitrile polymers containing from 55 to 90% by weight of a nitrile monomer, polyethylene terephthalate and polycaprolactam.

11. A refrigerator cabinet construction according to claim 7 in which the composite release fil comprises a layer that is an effective barrier to halohydrocarbon gases.

12. A refrigerator cabinet construction comprising a laminate of an ABS layer bonded to a composite release film comprising a first layer bonded to the ABS that is up to 4% of the thickness of the ABS layer and is formed from a polymer selected from polycaprolactam, polyethylene terephthalate and a nitrile polymer containing from 55 to 90% of an unsaturated nitrile monomer; and a second layer bonded to the first and having a thickness of up to 0.9% of the ABS inner layer thickness and formed from a olefin polymer, and bonded to said release film, a layer of a polyurethane foam which is in turn bonded to a metal outer layer, the bonding within the laminate being such that upon cycling between room temperature and −22° C. the differential thermal expansion of the layers in the laminate cause only the bond between the foam and the second layer of the composite release film to be ruptured.

13. An improved refrigerator cabinet construction comprising a laminate of an ABS inner layer bonded to a composite release film comprising a first layer formed of a polymer selected from nitrile polymers containing from 55 to 90% by weight of a nitrile monomer, polyethylene terephthalate and polycaprolactam and a second layer bonded to the first and formed of an olefin polymer, and bonded to the second layer a foamed polyurethane layer which is in turn bonded to a metal outer layer, wherein one or both of the contiguous faces of the first and second layers of the composite release film has been treated with an adhesion reducing agent such that when the laminate is cycled between room temperature and −22° C., the differential thermal expansion of the layers in the laminate cause only the bond between the first and second layers of the composite release film to be ruptured.

14. An improved refrigerator cabinet construction comprising a laminate of an ABS inner layer bonded to a composite release film comprising identical layers of a polymer selected from nitrile polymers containing from 55 to 90% by weight of a nitrile monomer, polyethylene terephthalate and polycaprolactam which is bonded to a polyurethane foam layer which in turn is bonded to a metal outer layer, wherein the one or both of the contiguous faces of the two layers of the composite release film has been treated with an adhesion reducing agent such that when the laminate is cycled between room temperature and −22° C., the differential thermal expansion of the layers in the laminate cause only the bond between the first and second layers of the composite release film to be ruptured.

* * * * *